Figure 14:
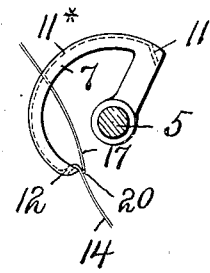

No. 875,607. PATENTED DEC. 31, 1907.
W. N. PARKES.
ORNAMENTAL STITCH SEWING MACHINE.
APPLICATION FILED MAR. 5, 1903.
4 SHEETS—SHEET 1.
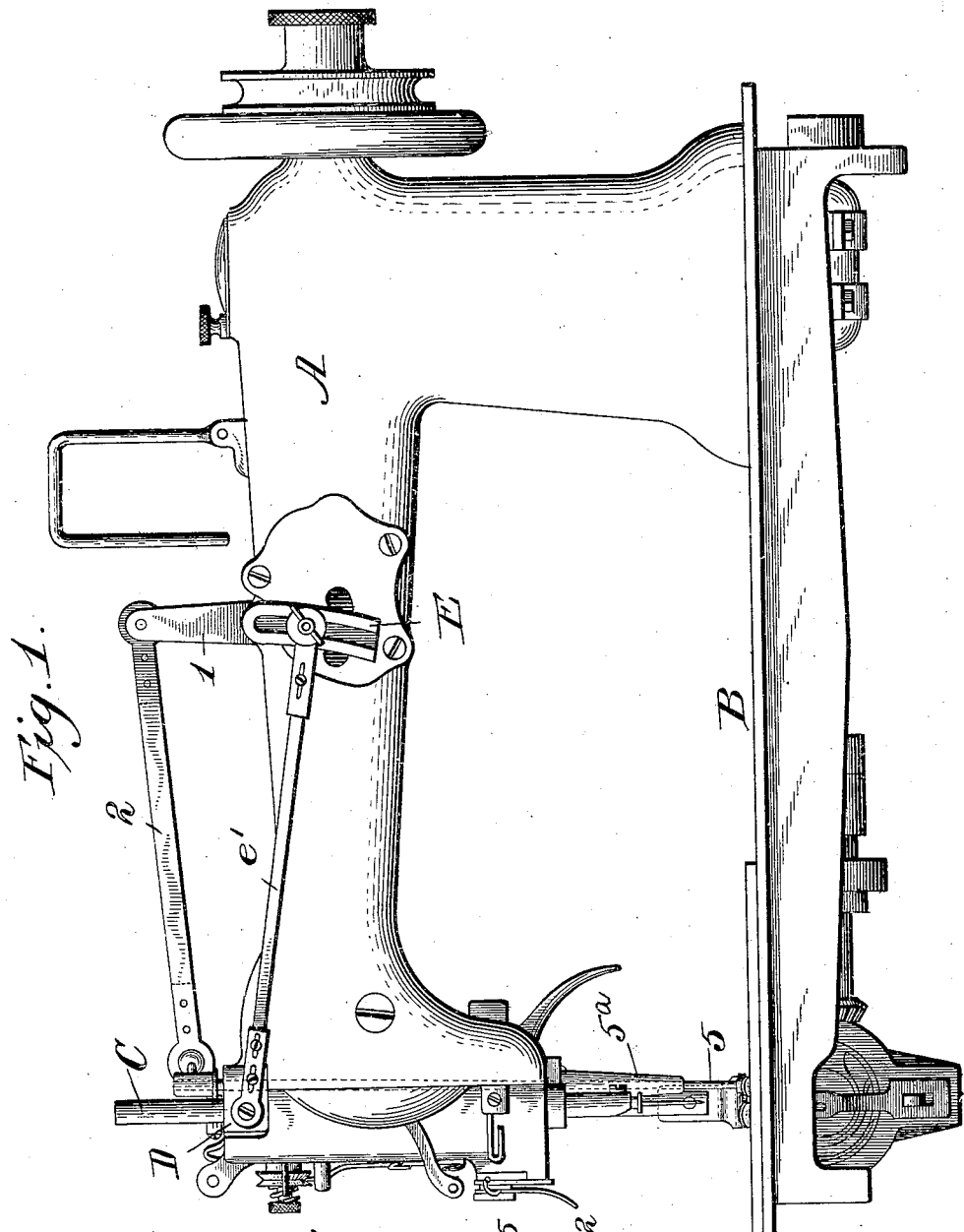
Witnesses:
Inventor:
William N. Parkes
Attorney:
By Chas. M. C. Chapman.

No. 875,607. PATENTED DEC. 31, 1907.
W. N. PARKES.
ORNAMENTAL STITCH SEWING MACHINE.
APPLICATION FILED MAR. 5, 1903.
4 SHEETS—SHEET 2.
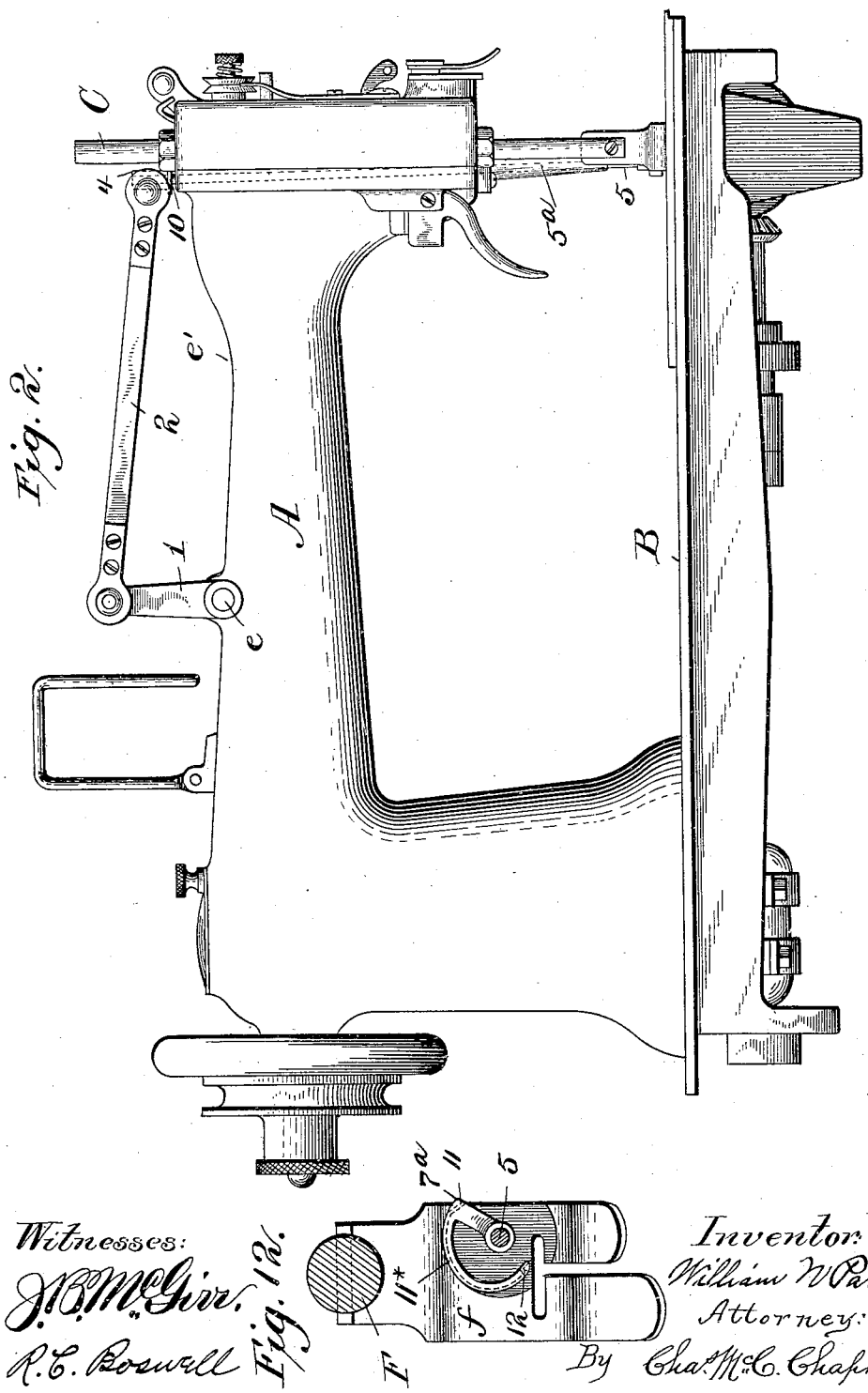

No. 875,607. PATENTED DEC. 31, 1907.
W. N. PARKES.
ORNAMENTAL STITCH SEWING MACHINE.
APPLICATION FILED MAR. 5, 1903.
4 SHEETS—SHEET 3.
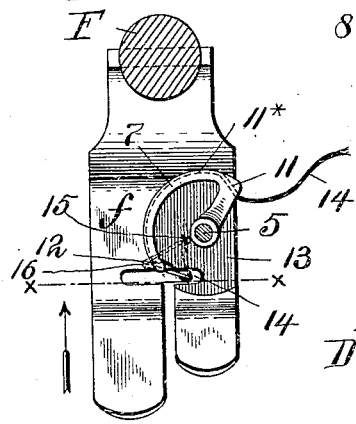
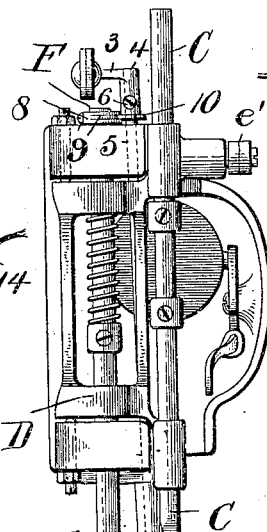
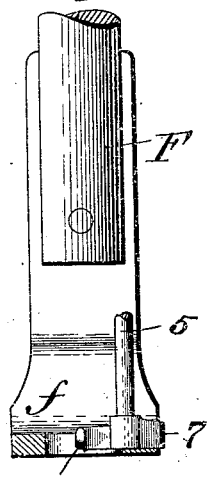
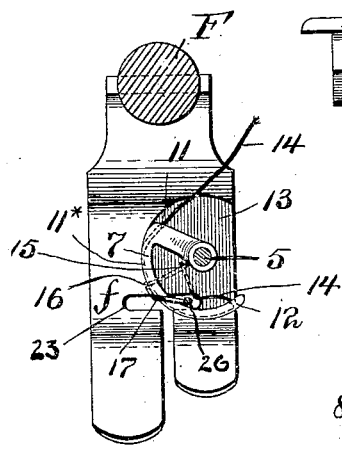
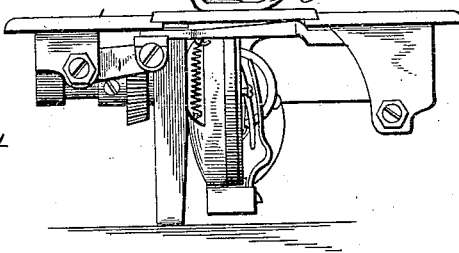
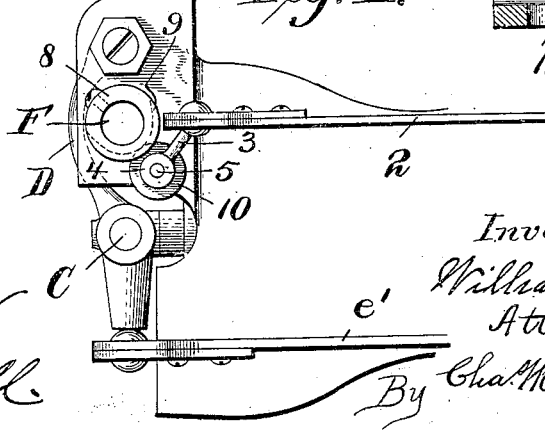
Witnesses:
J. B. McGirr.
R. C. Boswell.
Inventor:
William N. Parkes
Attorney:
By Chas. M. C. Chapman.
THE NORRIS PETERS CO., WASHINGTON, D. C.

No. 875,607. PATENTED DEC. 31, 1907.
W. N. PARKES.
ORNAMENTAL STITCH SEWING MACHINE.
APPLICATION FILED MAR. 5, 1903.

4 SHEETS—SHEET 4.

WITNESSES:
J.B. McGirr.
A.J. Verheyen.

INVENTOR
William N. Parkes.

UNITED STATES PATENT OFFICE.

WILLIAM N. PARKES, OF BROOKLYN, NEW YORK.

ORNAMENTAL-STITCH SEWING-MACHINE.

No. 875,607.  Specification of Letters Patent.  Patented Dec. 31, 1907.

Application filed March 5, 1903. Serial No. 146,417.

*To all whom it may concern:*

Be it known that I, WILLIAM N. PARKES, citizen of the United States, residing in Brooklyn, county of Kings, and State of New York, have invented a new and useful Improvement in Ornamental-Stitch Sewing-Machines, of which the following is a description.

My invention relates to sewing machines, and it belongs principally to the class in which the edge of the work is finished with embroidery stitches.

While it is mainly for use in ornamental edge work, it is also designed for ornamental and useful stitching on the body of the work, or in connecting two pieces of fabric together as will be readily understood from the illustrations and descriptions.

In sewing machines the needle penetrates the work, loop engagement takes place, then the needle is withdrawn and the thread is anchored in the work at the point where the needle penetrated it, and a stitch is said to have been made at this point. Then the work or needle is moved after which the latter again penetrates the work and another stitch is made. In plain stitch machines the needle reciprocates in a right line only, and the work moved in a right line only, but in a plane at right angles to that in which the needle reciprocates.

In various kinds of ornamental stitch, embroidery, button-hole machines and the like, a relative lateral movement is produced between the needle and the work so the stitches are anchored in different lateral positions in the work. But whether the stitches are anchored in the work in a straight line, or in different lateral positions, the thread runs on the surface of the work from one to another of said stitches. On the needle side, it is the needle thread that runs from one to another of said stitches, and on the looper side, in a lock stitch machine, it is the bobbin thread that runs from one to another of said stitches.

In this application, that portion of the needle thread that runs from one to another of the stitches, will be called a link of needle thread, and the stitches on the needle side of the work will be said to be connected by links of needle thread. It is thus seen that according to this definition the ends of two links of needle thread terminate in a stitch that is anchored in the work.

In my copending application Serial Number 289,646, filed November 29, 1905, for embroidery or ornamental stitch sewing machine, is shown and described means for looping an auxiliary thread consecutively around each needle thread that runs to the edge stitch along the edge of an embroidered design or scallop. And in said application the means for accomplishing the functions therein described are broadly claimed.

In my present invention means are provided for looping an auxiliary thread or cord consecutively around the two links of needle thread that run to the edge stitches along the edge of an embroidered design or scallop. And it is one of the main objects of my present invention to so loop an auxiliary thread around said links, and to draw the same taut to the edge of said embroidered scallop or design, so as to make a purl or button-hole finish along said edge.

While the prime object of the invention is to make said purl or button-hole finish along the edge of an embroidered design, it will be seen from the description that other valuable functions can be performed by the invention.

Other objects will appear during the course of this description.

The invention consists in the elements, features and combinations of parts hereinafter described and claimed.

Referring to the drawings: Figure 1 is a front elevation of a machine embodying my invention; Fig. 2 is a rear elevation of the same; Fig. 3 is a face view of the machine with the face plate removed; Fig. 4 is a top plan view of the same; Fig. 5 is an enlarged top plan view of the presser-foot showing the auxiliary looper in its forward position and the manner in which the needle-thread crosses the same; Fig. 6 is a view similar to Fig. 5, showing the auxiliary looper after it has become disengaged from the needle thread and before the work is moved forward; Fig. 7 is a vertical section of Fig. 6 on the line X—X, looking in the direction of the arrow, the threads being omitted. Fig. 8 is a diagrammatic view of the formation of a purl in combination with the overseaming or embroidery stitch; Fig. 9 is a view of a purl formed along the edge of an overseaming or embroidery stitch, portraying approximately the general appearance of the stitch when of normal size and when the auxiliary looper thread has been closely drawn around the needle-thread; Fig. 10 is a view of a stitch made when there is no lateral movement of the needle; Fig. 11 is a view of a stitch made with the form of looper shown in Figs. 12 and 13. Fig. 12 is a view similar to Fig. 5, showing the position of another form of auxiliary looper before it is moved forward; and Fig. 13 similarly shows the same after it is moved forward. Figs. 14, 15, 16 and 17 are details showing the manner in which the auxiliary thread is looped around the links of needle thread when the needle is not moved laterally.

In the drawings A, designates the overhanging arm; B, the cloth-plate; C, the needle-bar mounted in a gate D; E, a segment-arm secured to a shaft $e$, mounted in a bearing extending transversely to the overhanging arm of the machine. A link $e'$, connects the segment E, with the needle-bar gate D. The segment E, is vibrated in the usual manner from a switch-cam (not shown) which is mounted on the upper shaft of the machine within the arm. The mechanism so far described and the looper, or complemental stitch-forming and feeding mechanisms, may be of any well known type usual in overseaming sewing machines, and need no further description in connection with my invention. As is well known the segment arm E, is oscillated once to two reciprocations of the needle-bar and this movement, of course, oscillates the shaft $e$, the same number of times with respect to the reciprocations of the needle-bar, and the needle-bar gate D, being connected with the segment E, receives the usual oscillating or jogging motion. F, is the usual form of presser-bar, to the lower end of which is attached a presser-foot $f$.

To the rear end of the shaft $e$, is connected a vertically extending arm 1, having one end of a link 2, attached to its upper end, the other end of the link 2, having a socket for the reception of a ball attached to an arm 3, projecting from a sleeve or collar 4, which in turn is adjustably attached to a shaft or rod 5, by means of a set-screw 6. The ball and socket connection constitutes a universal joint. The rod or shaft 5, extends through bearings in the frame diagonally disposed with respect to the needle-bar C, as shown in Fig. 3, one of said bearings being elongated and depending from the frame, as shown at $5^a$. As shown the shaft 5, is long and slender and the elongated bearing $5^a$, provides a means for bracing the same. To the lower end of shaft 5, is attached an auxiliary or purling looper 7. To the upper end of the presser-bar F, is attached a collar 8, having a groove 9, formed in its periphery. A flange 10, is formed on the collar or sleeve 4, and extends normally into the groove 9, thus forming a loose and sliding connection between the presser-bar and the purling-looper shaft. This construction including part of the looper actuating mechanism, maintains a constant operative connection between the rod or shaft 5, and the presser-bar enabling said shaft to be oscillated without affecting the presser-bar, and also enables said shaft 5 to be lifted with the bar to the same extent, thus also always maintaining the same relation between the auxiliary looper and the presser-foot.

A hole 11, passes through the heel of the looper 7, terminating in a channel 11*, which passes along the outer edge of the looper to a delivery eye 12, which is formed in the toe of the looper. A receptacle or depression 13, is formed in the presser-foot $f$, to permit of the oscillation of the looper 7, and to bring the same close to the work, as shown in Figs. 5 and 7. The hole 11, the channel 11*, and the delivery eye 12, serve as a means for carrying and guiding the purling or looper thread 14.

In Figs. 12 and 13 is shown a modification of the auxiliary looper 7. In these figures it will be noticed that the nose of the looper is bent towards the pivot of the same so the thread carrying portion of it is not concentric with said pivot as is said portion in Figs. 5 and 6. The object of bending this portion of the looper as in said Figs. 12 and 13 is for the purpose of looping the auxiliary thread around two ends of links of needle thread as shown in Fig. 11. In making this figure it will be observed that the needle is not moved laterally and therefore the needle thread links run in substantially a straight line from one to the other of the stitches, but the auxiliary thread 14 is looped around links of needle thread substantially the same as when the needle is moved laterally as will be understood by referring to Figs. 8, 11, 14, 15, 16 and 17.

Figure 15:
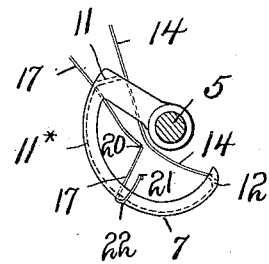
Figure 16:
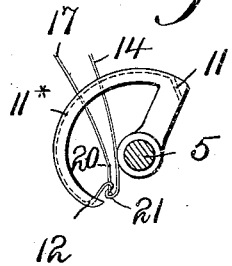
Figure 17:
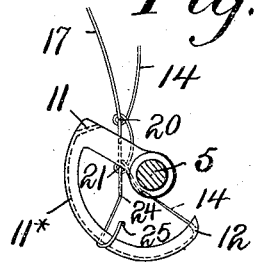

In Figs. 14, 15, 16 and 17 the looper 7 is shown in the same position it is shown in Figs. 12 and 13, but with the presser foot removed so that the manner in which the auxiliary cord is looped around the links of needle thread may be seen more clearly. In Fig. 14 the numeral 20 indicates the location of a stitch. It is seen in this figure that the nose of the looper 7 is just back of the needle thread 17, so that when the looper is moved forward it will pass back of it as indicated in Fig. 15. In this figure it will be noticed that the stitch 20 is located back further, which indicates that the work has moved this extent, and a new stitch 21 has been located in the work within the loop of looper thread or cord 14. And a link 22 of needle thread extends under and over the looper from stitch 20 to stitch 21. By referring to figure 12 it will be understood that as the looper moves to this position the wall of the back of the needle slot 23 will push the link 22 of needle thread off of the looper 7. In Fig. 16 is indicated the threads after the said link has been discharged from said looper. In Fig. 17 the location of the stitches indicate that the work has been moved again. Assuming that 21, in Fig. 17 is the same stitch as indicated by this numeral in Figs. 15 and 16 it will be seen that succeeding stitches 24 and 25 have been made. And it will also be seen that the auxiliary thread 14 is looped around alternate stitches same as it is in Fig. 8, the only difference being in said Fig. 8 the stitches are alternately located laterally, as in embroidery, button-hole, ornamental stitch and various other special machines.

In Figs. 5 and 6 the nose of the looper 7 is not bent toward its axis, as it is in Fig. 12 and 13 as has been before noted. It is preferable not to bend the looper when the needle is vibrated laterally because the looper thread may be readily looped around the links of needle thread with the loop extending in a path concentric with its axis, as shown in said figures.

Referring now to the operation of my device when the needle is moved laterally, let it be assumed that 15 in Fig. 6, indicates the location of a stitch around which the auxiliary thread 14 has been looped. After this stitch has been completed the work is moved forward, the needle is moved to the left, and a succeeding stitch 16 is anchored in the work. When this stitch 16 is made the looper 7 is in the position shown in said figure. After this stitch has been made the looper is moved to the position shown in Fig. 5, and the needle is moved to the right across the path of the looper after which it descends in the loop of looper thread extending from stitch 15 to the nose of the looper, and stitch indicated by 26 is anchored in the work. The next movements of the parts the looper returns to its initial position, the needle is moved to the left and another stitch is deposited in the work, and so the stitches are made, and the auxiliary thread looped about the links of needle thread that terminate into alternate stitches.

It is again noted that the portion of needle thread that runs from one to another of the stitches is a link of needle thread, and attention is particularly drawn to the fact that the auxiliary thread 14 is looped around both links of needle thread at the point where they run to a stitch. And the difference between the stitches shown in Figs. 8, 9 and 11 as compared with Fig. 10 is to be noted. In this Fig. 10, the auxiliary thread is simply passed back and forth under the needle which is desirable for some kinds of ornamentation but not suitable for the finishing of an embroidered edge. This stitch is shown for the purpose of bringing out the fact that with applicant's invention this old and well known ornamentation may also be made. In the operation of my device this ornamentation may be made by moving the end of the connection e' over the axis of the segment lever E, and this same adjustment is also made in making the design shown in Fig. 11. When this connection is so adjusted the needle is not moved laterally. To make the design shown in said Fig. 11 a looper as shown in Figs. 12 and 13 is used as before explained. But in making the design shown in Fig. 10, the looper is used as shown in Figs. 5 and 6. By following the movements of this looper it will be readily seen that if the needle is not moved laterally it will not cross the path of the looper and therefore the needle will not enter a loop of auxiliary thread, and the part of said thread that runs from the looper will simply pass back and forth under the needles, and the result will be an ornamental row of stitching as shown in Fig. 10. It is to be understood that the making of this ornamental stitching is merely an incidental use that may be made of my invention, the main object being to loop the auxiliary thread around the links of needle thread as illustrated in Figs. 8, 9 and 11.

In practice in the operation of my device the auxiliary thread 14 is run through a usual tension device. Any suitable tension device that will produce a tension on this auxiliary thread or cord in the same manner in which a tension is produced on the needle thread may be used. And of course by changing the degree of tension on said auxiliary thread the appearance of the stitch may be modified. In practice when making a purl along the edge of the path of the embroidery stitches, the tension on the auxiliary thread 14 is made strong enough to draw the purling thread taut along the edge of said path, when the said purl will be located as indicated in Fig. 9. One of the important objects of this purling or looping of a thread along the edge of the embroidered path may be more particularly noted at this point. The lateral stitches are anchored in the work, as before stated, but when the embroidery is for the purpose of finishing the edge of the work the stitches along said edge are not anchored in the work, and it therefore becomes important to connect these edge stitches one with the other along the extreme edge of the work. By referring to Fig. 8, it will be readily understood that the purling thread 14 when drawn taut will hold the edge stitches in place longitudinally of the edge of the embroidered path. And in addition to holding said edge stitches in place, the said purling thread produces a continuous finish along said edge, which gives this edge embroidery the appearance of hand work.

As before noted the needle bar gate is moved laterally from the movement of the segment lever E, which latter is operated in a usual manner by a switch cam. This switch cam as is well known moves the segment lever laterally in one direction during one rotation of the driving shaft of the machine and then during the next rotation of said shaft the said cam moves said lever back again. The needle in my machine as in the usual zigzag machine is moved laterally from the lateral movement of the said usual segment lever. As the segment lever E is secured to a usual short shaft $e$, it is seen that the said shaft is oscillated in unison with the lateral oscillations of said segment lever. To economize in the mechanism of my machine I operate my auxiliary looper from the movement of the oscillating shaft $e$, as has been described, and by following the connection through from the said shaft to said looper it will be seen that the looper moves laterally in unison with the lateral movements of the needle, and in the same direction in which the needle moves laterally.

At this point it is desired to call special attention to the location of the working position of the auxiliary looper relative to the lateral working position of the needle, and to emphasize the importance of this relation between said elements. In the operation of the machine the auxiliary looper is moved laterally substantially the extent indicated by the difference between the position of said looper in its first position as in Fig. 6, to its second position as in Fig. 5. It will be observed that in the said second position the delivery eye 12 is moved to the right of the edge stitch that is anchored in the work, then it is moved to the left of said edge stitch as in Fig. 6. It will therefore be understood that the auxiliary thread 14 is taut when the auxiliary looper is in its second position, that the supply of auxiliary thread is drawn and the looper finishes its movement in this position, and the preceding loop of auxiliary thread is drawn taut around the links of needle thread and to the edge of the embroidered path. The distance between the delivery eye 12 and the edge stitch when the looper is in its first position, is sufficiently less than when it is in its second position, to prevent the auxiliary thread from being drawn taut in said first position. It is therefore seen that there is no tendency to draw the loops of auxiliary thread away from the edge of the embroidered path, but that the location of the parts is such that the auxiliary thread is looped around links of the needle thread, and drawn taut around the same to the edge of the embroidered path.

The size of the loops made may be increased or decreased by changing the working position of the looper to work more or less to one side relative to the other side of the point where the preceding stitch is anchored in the work. This working position of said looper may be adjusted by means of the set screw 6, shown in Fig. 3. It is of course clear that when this screw is loosened the shaft 5 is free to turn, and that therefore the working position of said looper may be adjusted at this point.

In connection with the feed mechanism used in connection with my invention for moving the work it is noted that any suitable feed mechanism may be used for this purpose. In practice I use an ordinary feed mechanism such for example as is used in an ordinary zigzag machine, but as the said mechanism forms no part of my invention, it has not been herein illustrated or described.

Having thus described my invention what I claim and desire to secure by Letters Patent is:

1. In a sewing machine, a stitch-forming mechanism including a needle-bar that reciprocates longitudinally only, an auxiliary thread or cord carrier that is adapted to loop its thread completely around alternate stitches only made by said stitch-forming mechanism, and means separate from the movement of the needle bar for operating said carrier.

2. In a sewing machine, a stitch-forming mechanism, including a needle bar that reciprocates longitudinally only, an auxiliary thread or cord carrier adapted to oscillate in a horizontal plane and thereby loop its thread completely around alternate stitches only made by said stitch-forming mechanism, and means separate from the movement of the needle-bar for operating said carrier.

3. A sewing machine having a vertically reciprocating and laterally vibrating needle, an auxiliary thread carrying looper, means for operating said looper so that it loops its own thread around alternate stitches only made by said stitch forming mechanism, and means for so locating the working position of said looper relative to said stitch forming mechanism that the loops formed by the looper are drawn in line with one row of lateral stitches made by said stitch forming mechanism.

4. A sewing machine having a stitch forming mechanism comprising a vertically reciprocating and laterally vibrating needle, an auxiliary thread carrying looper, the thread carrying portion of said looper extending in an arc of a circle in a plane at right angles to the plane in which said needle reciprocates, and means for operating said looper so that its thread is looped around alternate stitches only made by said stitch forming mechanism and drawn taut in line with one row of lateral stitches.

5. A sewing machine comprising a reciprocating and vibrating needle and complemental stitch forming mechanism; a presser foot having a depression therein; a looper housed by and operated entirely in said depression and means for oscillating the looper in alternation with the reciprocations of the needle.

In testimony whereof I have hereunto signed my name in the presence of two subscribing witnesses.

WILLIAM N. PARKES.

Witnesses:
CHAS. McC. CHAPMAN,
M. B. HOARE.